(12) United States Patent
Otsuki et al.

(10) Patent No.: US 6,356,398 B1
(45) Date of Patent: Mar. 12, 2002

(54) LENS HAVING DIAPHRAGM STRUCTURE AT OUTER EDGE PORTION ON INCIDENT SIDE THEREOF AND OPTICAL UNIT USING SAME

(75) Inventors: Motohiko Otsuki; Kimihiro Kikuchi, both of Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/477,773

(22) Filed: Jan. 4, 2000

(30) Foreign Application Priority Data

Jan. 6, 1999 (JP) .......................................... 11-001098

(51) Int. Cl.[7] ................................................ G02B 9/00
(52) U.S. Cl. ...................... 359/739; 359/718; 359/714; 264/1.1
(58) Field of Search ................................ 359/718, 719, 359/714, 712, 713, 738, 739; 264/1.1

(56) References Cited

U.S. PATENT DOCUMENTS

| | | | | | |
|---|---|---|---|---|---|
| 5,339,123 A | * | 8/1994 | Soshi et al. | .................. | 354/106 |
| 5,699,201 A | * | 12/1997 | Lee | .................. | 359/708 |
| 6,052,233 A | * | 4/2000 | Koike | .................. | 359/642 |
| 6,144,500 A | * | 11/2000 | Iwaki et al. | .................. | 359/719 |
| 6,172,944 B1 | * | 1/2001 | Hatam-Tabrizi | .................. | 369/13 |

FOREIGN PATENT DOCUMENTS

JP            10-208273            8/1998

* cited by examiner

*Primary Examiner*—Georgia Epps
*Assistant Examiner*—Tim Thompson
(74) *Attorney, Agent, or Firm*—Brinks Hofer Gilson & Lione

(57) ABSTRACT

A diaphragm structure is provided at an outer edge portion on an incident side of a lens which converges a collimated incident light and outputs the converged light, the diaphragm structure being constructed so that a portion of the collimated incident light is reflected away from or toward an optical axis of the collimated light.

4 Claims, 3 Drawing Sheets

LENS HAVING DIAPHRAGM STRUCTURE AT OUTER EDGE PORTION ON INCIDENT SIDE THEREOF AND OPTICAL UNIT USING SAME

BACKGROUND OF THE INVENTION

1. Field of the Invention

The present invention relates to a lens having a diaphragm for converging a collimated light beam and an optical unit which utilizes an optical system using the lens and using a collimated light beam. For example, the invention is concerned with a lens suitable for use in a magneto-optic disk unit for recording and reproducing information to and from a magneto-optic disk or in an optical communication system.

2. Description of the Prior Art

A conventional optical unit which utilizes an optical system using a collimated light beam will now be described with reference to an optical communication system as an example. An optical communication system is known in which a signal is subjected to photoelectric conversion, a corresponding light beam is emitted from a laser diode and is collimated by a collimator lens, and the thus-collimated beam is converged on an end face of an optical fiber. As another conventional optical unit there is known an optical head unit which performs information recording and reproducing operations for a magneto-optic disk (a recording medium) and in which a diaphragm mechanism for restricting the beam diameter is attached to an objective lens which is for converging a laser beam as a beam spot onto a recording/reproducing side of the recording medium.

Now, with reference to FIG. 5, the following description is provided about a lens having a diaphragm structure in a conventional optical unit.

FIG. 5 is a sectional view showing a conventional lens. As shown in the same figure, a lens 11 (for example an objective lens) is a circular convex lens obtained by molding a transparent optical material capable of being molded such as glass or plastic material.

The lens 11 is provided with a central incident lens portion 12 projecting outward (upward) in a generally semispherical shape, an exit lens portion 13 projecting in a generally circular shape outward (downward) on the side opposite to the incident lens portion 12, and an annular flange portion 14 provided along outer edges of the incident lens portion 12 and the exit lens portion 13.

The flange portion 14 has an incident surface 14a located on the incident lens portion 12 side and an exit surface 14b located on the exit lens portion 13 side. The incident surface 14a and the exit surface 14b are parallel to each other and perpendicular to an optical axis of the lens 11.

The flange portion 14 thus formed perpendicularly to the optical axis of the lens 11 exhibits a diaphragm function for the lens 11.

The operation of the conventional lens will be described below on the basis of the optical unit.

An incident light beam A (laser beam) is applied at a predetermined beam diameter and in parallel with the optical axis of the lens 11 from a laser beam source (not shown) disposed on the incident lens portion 12 side of the lens 11 (for example an objective lens). A portion of the parallel incident beam A incident on the incident lens portion 12 is converted as a beam spot by both incident and exit lens portions 12, 13. The beam spot is focused on a recording medium (not shown) and is reflected by the recording medium. The reflected beam passes through the lens 11 and is detected by a photodetector (not shown) disposed on the incident lens portion 12 side.

On the other hand, a portion of the parallel incident beam A is incident on the flange portion 14 and is partially reflected by the incident surface 14a of the flange portion. The thus-reflected incident beam portion returns in parallel with the optical axis of the lens 11, that is, along the incident optical axis. A portion of the incident beam A passes through the incident surface 14a and is not converged as a beam spot. Thus, the flange portion 14 functions as a diaphragm mechanism.

In the conventional lens 11, as described above, since the diaphragm mechanism is constituted of the incident surface 14a of the flange portion 14 which is formed so as to intersect the incident optical axis perpendicularly, a portion of the beam incident on the incident surface 14a is reflected by the same surface and returns to the incident beam side. This undesirable reflected beam joins the information-carrying return beam reflected from the recording medium and is converged on the light receiving surface of the photodetector. Once the reflected beam returned from the incident surface 14a is detected by the photodetector, there arises noise and thus the return beam from the recording medium can no longer be detected with a high accuracy, with consequent occurrence of a detection error.

In an optical communication system using the conventional lens, the undesirable beam reflected by the incident surface 14a as a diaphragm portion becomes a return beam to the laser diode, giving rise to the problem that there occurs an output variation or a wavelength variation of the laser beam.

In a lens having a diaphragm structure, this problem may be solved by forming a reflection preventing film on an outer edge portion of the lens or by roughening (matting) an incident surface to scatter an incident light beam. However, for forming a reflection preventing film or a matted surface for the flange portion of the lens, it is necessary to provide separate such film or surface forming steps for the flange portion and an effective lens portion (masking is required in an alternate manner) or it is necessary to hold a side face of the lens flange portion with a jig.

No matter which method may be adopted for the formation of such reflection preventing film or matted surface, an increase of the manufacturing cost is unavoidable due to an increase in the number of steps or due to the provision of a special jig.

Besides, it is impossible to form the flange portion small because an allowance for machining is required in forming the reflection preventing film or matted surface. Consequently, the lens becomes larger in diameter and it is therefore impossible to reduce the size and weight of the optical unit.

SUMMARY OF THE INVENTION

The present invention has been accomplished for solving the above-mentioned problems and it is an object of the invention to provide a lens with a diaphragm capable of being fabricated easily and capable of diminishing the influence of an undesirable return light, as well as an optical unit using the lens which optical unit can be reduced in size and weight.

According to the present invention there is provided a lens for converging a collimated incident light and outputting the resulting converged light, the lens having a diaphragm structure at an outer edge portion of an incident side thereof, said diaphragm structure being constructed in such a manner that a portion of the collimated incident light is reflected and the reflected light advances away from or toward an optical axis of the collimated light.

In the lens of the present invention, the diaphragm structure has a collimated light incident surface which is an arcuate surface or an inclined surface.

According to the present invention there also is provided an optical unit using a lens for converging a collimated incident light and outputting the resulting converged light, the lens having a diaphragm structure at an outer edge portion of an incident side thereof, the diaphragm structure being constructed in such manner that a portion of the collimated incident light is reflected and the reflected light advances away from or toward an optical axis of the collimated light.

DETAILED DESCRIPTION OF PREFERRED EMBODIMENTS

Lenses embodying the present invention will be described hereinunder with reference to the accompanying drawings.

Figure 1:
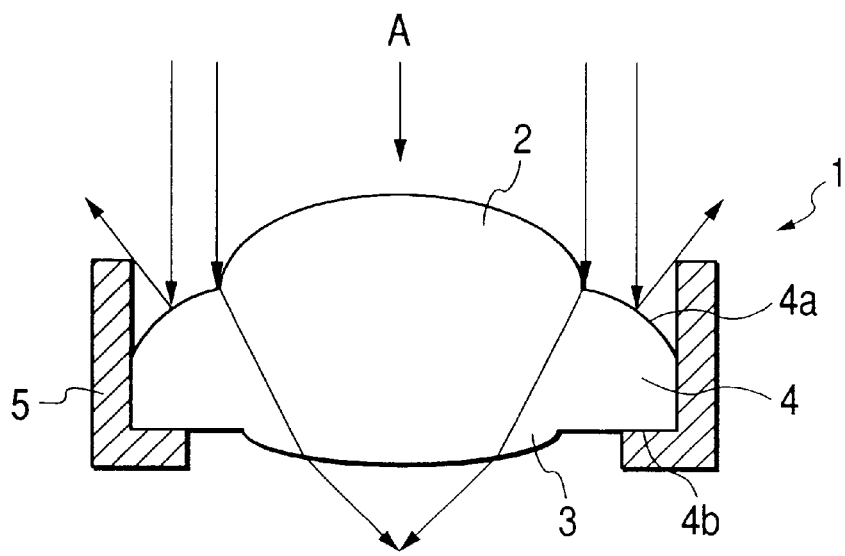
FIG. 1 is a sectional view of a lens according to an embodiment of the present invention.

FIG. 1 is a sectional view of a lens according to an embodiment of the present invention. As shown in the same figure, a lens 1 (for example an objective lens) is formed of a transparent optical material capable of being molded such as, for example, glass or plastic material. A circular convex lens and a diaphragm portion are formed integrally by pressing within a press mold. For example, the lens 1 is received in a cylindrical lens barrel 5 formed of stainless steel.

The lens 1 comprises a central incident lens portion 2 projecting in a generally semispherical shape outward (upward), an exit lens portion 3 projecting in a generally circular shape outward (downward) on the side opposite to the incident lens portion 2, and an annular flange portion 4 formed along outer edges of the incident and exit lens portions 2, 3.

The flange portion 4 has an incident surface 4a located on the incident lens portion 2 side and an exit surface 4b located on the exit lens portion 3 side. The incident surface 4a is an arcuate surface expanding outward with respect to an optical axis of the lens 1, while the exit surface 4b is formed as a flat surface perpendicular to an optical axis of the lens 1.

The incident surface 4a is optically designed so that a collimated light incident thereon is reflected in a direction away from the optical axis thereof. The incident surface 4a possesses not only a collimated light diaphragm function but also a function of preventing an undesirable reflection of the collimated light to the incidence side.

In the lens embodying the present invention, since a diaphragm portion having a reflection preventing function is integrally formed by transfer at the peripheral edge of the lens simultaneously with lens machining, a diaphragm portion of a desired aperture can be formed directly and integrally with the lens in a highly accurate manner and the reflection preventing function of the diaphragm portion can be imparted to the lens, thus permitting reduction in the manufacturing cost of the lens.

The operation of the lens will be described below while referring to an example of application to an objective lens used in an optical head unit.

Figure 3:
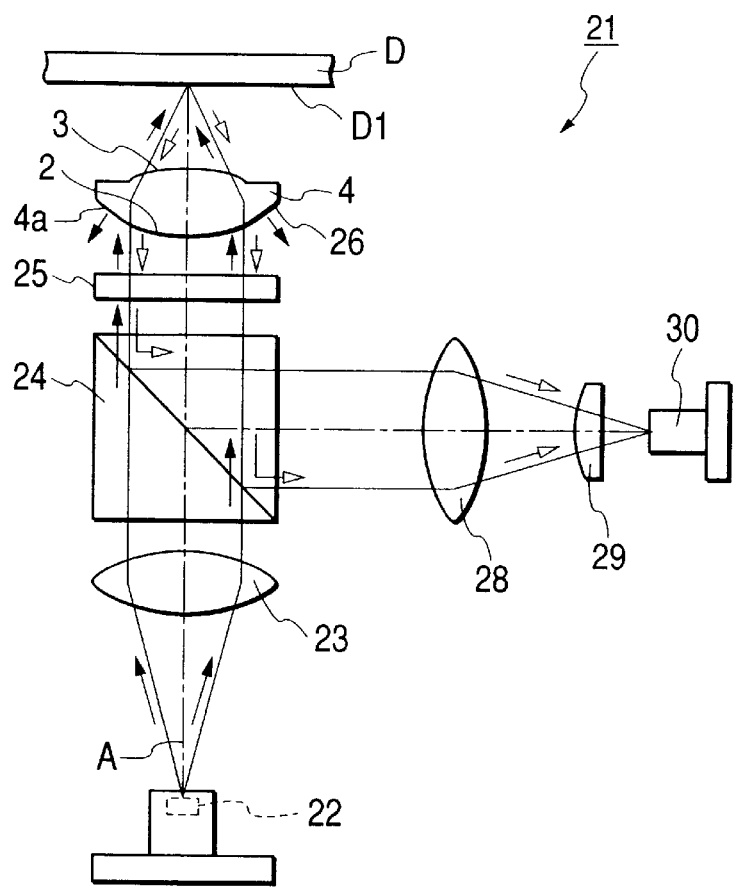
FIG. 3 is a schematic explanatory diagram showing an optical system in an optical head unit using a lens according to the present invention.

FIG. 3 is a schematic explanatory diagram showing an optical system in an optical head unit using the lens embodying the present invention.

The optical head unit, indicated at 21, comprises a laser diode 22, a collimator lens 23 for converting a divergent laser beam A emitted from the laser diode 22 into a collimated beam, an optical isolator comprising a polarization beam splitter 24 and a quarter plate 25, an objective lens 26 for converging the laser beam A which has passed through the optical isolator, as a beam spot, onto a recording surface D1 of a recording medium D, a collimator lens 28 for again collimating a return beam after being reflected by the recording surface D1 and after subsequent isolation through the polarization beam splitter 24 and the quarter plate 25, and a photodetector 30 constituted of a photodiode which, through a cylindrical lens 29, detects the beam outputted from the collimator lens 28. The objective lens 26 is disposed so that its incident lens portion 2 and the incident surface 4a of its flange portion 4 are opposed to the laser diode 22 side.

When the beam A emitted from the laser diode 22 is incident in parallel on the objective lens 26, a portion of the incident beam A is reflected in a direction away from the optical axis of the objective lens 26 by the incident surface 4a as an arcuate surface of the flange portion 4. Thus, the collimated beam is diaphragmed to a predetermined beam diameter by the incident surface 4a and there is no fear that an desirable reflected beam at the diaphragm portion (incident surface 4a) integral with the lens may return onto the incident optical axis.

A portion of the incident beam A incident on the incident lens portion 2 is converged as a beam spot by both incident lens portion 2 and exit lens portion 3. This beam spot is focused on the recording surface D1 of the recording medium D and is reflected by pits which comprise fine concaves and convexes formed according to recording information and the thus-reflected beam is again directed as an information-carrying return beam to the exit lens portion 3 of the objective lens 26.

The information-carrying return beam which has passed through the incident lens portion 2 of the objective lens 26 again passes through the isolator successively in the order of the quarter plate 25 and the polarization beam splitter 24 and is isolated thereby. The beam thus isolated is detected by the photodetector 30 through the collimator lens 28 and the cylindrical lens 29 and is subjected to photoelectric conversion. The resulting electric signal as recorded information is transmitted to a control circuit of a magneto-optic disk unit (not shown), in which the recorded information is read.

Thus, in the optical head unit using the lens embodying the present invention, since a diaphragm portion having reflection return preventing function is formed directly on an objective lens, a collimated beam can be diaphragmed and converged to a desired aperture and an undesirable reflected beam from the diaphragm portion can be prevented from being detected erroneously by the photodetector. Besides, a desired diaphragm can be formed accurately even for a small-sized lens and therefore the objective lens used can be reduced in size, thus permitting the reduction in size and weight of the optical head unit using the objective lens.

Particularly, in a magneto-optic memory system using a floating type optical head unit, the reduction in weight of the optical head makes it possible to decrease the floating quantity and increase the memory capacity.

A lens according to another embodiment of the present invention will be described below with reference to the accompanying drawings.

Figure 2:
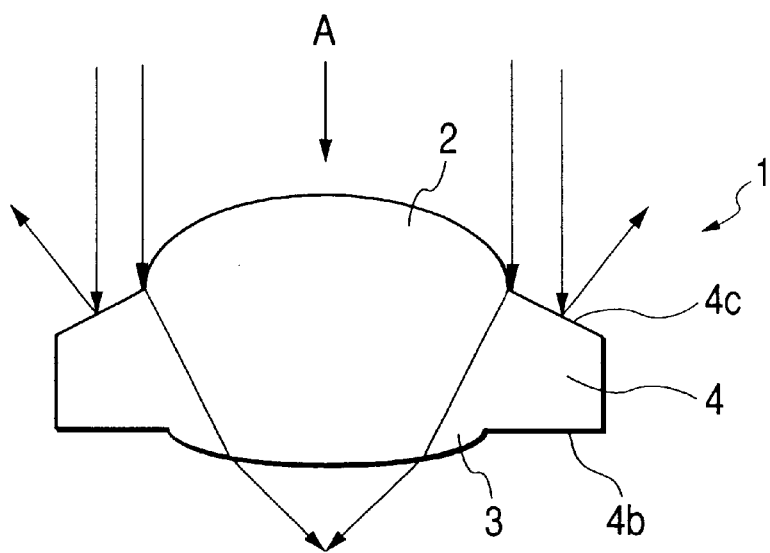
FIG. 2 is a sectional view of a lens according to a second embodiment of the present invention.

FIG. 2 is a sectional view of the lens, in which the same portions as in the previous embodiment are identified by the same reference numerals.

A difference from the previous embodiment resides in the construction of an incident surface 4c of a flange portion 4 in the lens (for example an objective lens) indicated at 1. As shown in FIG. 2, the incident surface 4a of the flange portion 4 is an inclined surface which is inclined at a predetermined angle relative to an optical axis of the lens 1. An exit surface 4b of the flange portion 4 is formed as a flat surface perpendicular to the optical axis of the lens 1.

The flange portion 4 having the incident surface 4c inclined relative to the optical axis of the lens 1 constitutes a diaphragm structure of the lens.

The operation of the lens according to this embodiment is the same as in the previous embodiment. An incident beam A incident in parallel on an incident lens portion 2 is converged as a beam spot onto a recording medium, while an incident beam A incident in parallel on the flange portion 4 is not converged as a beam spot.

A portion of the incident beam reflected by the incident surface 4c advances in a direction away from the optical axis of the lens.

Although according to the diaphragm structure of the lens in each of the above embodiments an arcuate or inclined surface of the flange portion faces the outer edge side of the lens to reflect a collimated beam in a direction away from the optical axis of the lens, no limitation is made thereto. Such an arcuate or inclined surface may face the optical axis side of the lens so as to reflect the collimated beam toward the optical axis.

Reference will be made below to a further embodiment of the present invention in which the lens of the invention is used as a condenser lens in an optical communication system.

Figure 4:
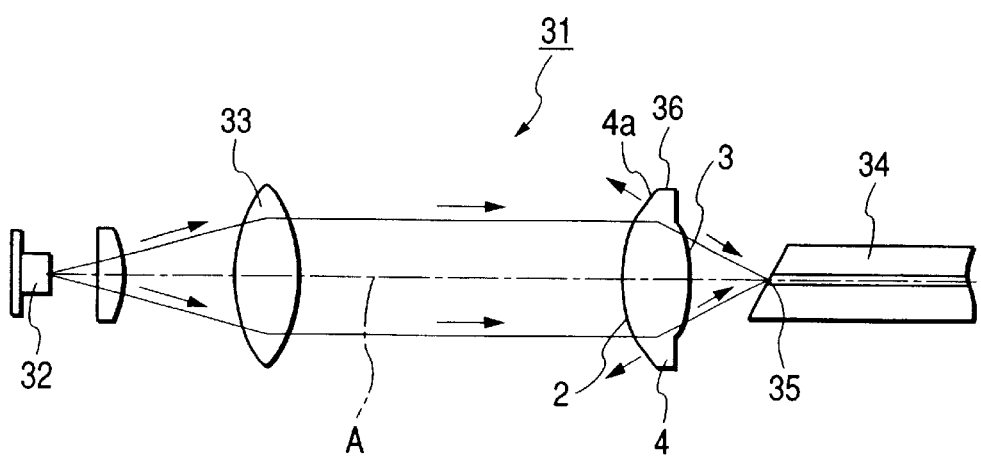
FIG. 4 is a schematic explanatory diagram showing an optical system in an optical communication system using a lens according to the present invention.
Figure 5:
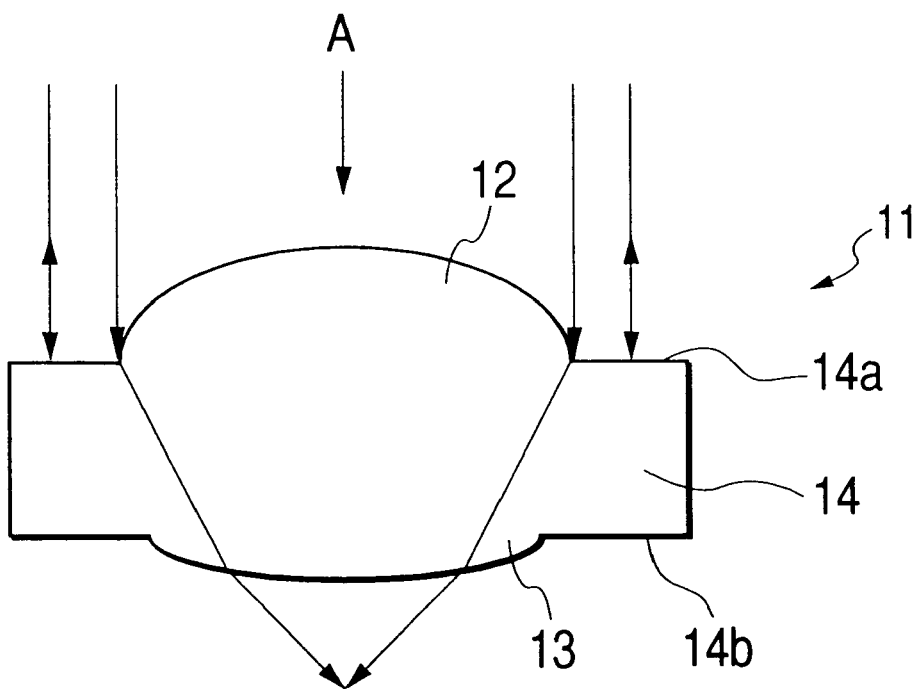
FIG. 5 is a sectional view showing a conventional lens.

FIG. 4 is a schematic explanatory diagram showing an optical system used in the optical communication system. As shown in the same figure, the optical communication system, indicated at 31, comprises a laser diode 32, a collimator lens 33 for converging a divergent laser beam A emitted from the laser diode 32 into a collimated beam, and a lens 36 for converging the collimated beam from the collimator lens 33 onto a core 35 of an optical fiber 34.

The lens 36 is disposed so that an incident lens portion 2 thereof and an incident surface 4a of its flange portion 4 are opposed to the laser diode 32 side. When a beam A emitted from the laser diode 32 is incident in parallel on the lens 36, a portion thereof incident on the flange portion 4 is reflected in a direction away from an optical axis of the lens 36 by the incident surface 4 which is an arcuate surface of the flange portion 4.

Thus, the collimated beam is diaphragmed to a predetermined beam diameter by the incident surface 4a and there is no fear that an undesirable reflected beam reflected at the diaphragm portion (incident surface 4a) integral with the lens 6 may return onto the incident optical axis.

On the other hand, a portion of the incident beam A incident on the incident lens portion 2 is converged as a beam spot by both incident lens portion 2 and exit lens portion 3. This beam spot is incident on the core 35 of the optical fiber 34 and a signal resulting from photoelectric conversion is transmitted on the optical fiber to effect communication.

Thus, in the optical communication system using the lens embodying the present invention, since a diaphragm portion having a reflection return preventing function is formed directly on the lens, a collimated beam can be diaphragmed to a desired aperture and converged and an undesirable reflected beam from the diaphragm portion can be prevented from returning to the laser diode side, there is no fear that there may occur any inconvenience in the emission of a laser beam. Moreover, since a desired diaphragm can be formed with a high accuracy even for a small-sized lens, it is possible to reduce the size of the lens and hence possible to reduce the size and weight of the optical communication system using the lens.

Since the diaphragm structure of the lens according to the present invention is constructed so that a reflected beam of a collimated beam advances away from or toward the optical axis of the collimated beam, it is possible to prevent return of an undesirable reflected beam from the diaphragm structure.

Further, since the collimated beam incident surface of the diaphragm structure in the lens is formed as an arcuate or inclined surface, the diaphragm structure can be formed integrally with the lens portion easily by pressing or the like, so that the lens can be provided less expensively.

Additionally, in an optical unit using the lens of the invention, the influence of noise caused by an undesirable return beam on a laser beam source and a photodetector can be prevented and it becomes possible to reduce the size and weight of the optical unit.

What is claimed is:

1. A lens that converges a collimated incident light beam, said lens comprising a diaphragm structure at an outer edge thereof, wherein a portion of the collimated incident light beam impinging on said diaphragm structure is reflected away from an optical axis of the collimated light beam, a surface of said diaphragm structure upon which the collimated incident light beam impinges is an arcuate surface.

2. An optical system having an optical head unit, the optical head unit comprising a lens that converges a collimated incident light beam, said lens having a diaphragm structure at an outer edge thereof, wherein a portion of the collimated incident light beam impinging on said diaphragm structure is reflected away from an optical axis of the collimated light beam, a surface of the diaphragm structure upon which the collimated incident light beam impinges is an arcuate surface.

3. A lens that focuses a collimated incident light beam, the lens comprising an incident lens portion and a flange portion adjacent to the incident lens portion, the flange portion having an inclined surface, the collimated incident light beam that impinges on the incident lens portion being focused and the collimated incident light beam that impinges on the inclined surface being reflected away from an optical axis of the collimated light beam.

4. An optical system having an optical head unit, the optical head unit comprising a lens that focuses a collimated incident light beam, the lens comprising an incident lens portion and a flange portion adjacent to the incident lens portion, the flange portion having an inclined surface, the collimated incident light beam that impinges on the incident lens portion being focused and the collimated incident light beam that impinges on the inclined surface being reflected away from an optical axis of the collimated light beam.

* * * * *